(12) United States Patent
Ducroquet (10) Patent No.: US 12,543,621 B2
(45) Date of Patent: Feb. 10, 2026

(54) AGRICULTURAL MACHINE OPERABLE IN A COMBINED OR IN A SEPARATED CONFIGURATION

(71) Applicant: AGCO International GmbH, Neuhausen (CH)

(72) Inventor: Frederic Ducroquet, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 507 days.

(21) Appl. No.: 18/153,186

(22) Filed: Jan. 11, 2023

(65) Prior Publication Data
US 2023/0240169 A1 Aug. 3, 2023

(30) Foreign Application Priority Data
Jan. 28, 2022 (GB) ..................................... 2201126

(51) Int. Cl.
*A01B 73/00* (2006.01)
(52) U.S. Cl.
CPC ................................... *A01B 73/00* (2013.01)
(58) Field of Classification Search
CPC ........ A01B 73/00; A01B 69/00; B62D 53/04; B60P 1/43
See application file for complete search history.

(56) References Cited

U.S. PATENT DOCUMENTS

| | | | |
|---|---|---|---|
| 6,244,613 B1 * | 6/2001 | Renger | .................... B60G 9/02 280/485 |
| 6,536,822 B1 | 3/2003 | Vagedes et al. | |
| 10,857,925 B1 * | 12/2020 | Sahota | ................. G05D 1/0011 |
| 2019/0104673 A1 | 4/2019 | Potter | |

FOREIGN PATENT DOCUMENTS

| | | | | |
|---|---|---|---|---|
| DE | 102020100485 A1 | 7/2021 | | |
| EP | 3939831 A1 | 1/2022 | | |
| GB | 2276132 A * | 9/1994 | ................ B60P 3/06 |
| JP | 2002347501 A | 12/2002 | | |
| WO | 2020007934 A1 | 1/2020 | | |

OTHER PUBLICATIONS

Jk Intellectual Property Office, Search report for related UK Application No. GB2201126.6, dated Jul. 27, 2022, 4 pages.

* cited by examiner

*Primary Examiner* — Jason D Shanske
*Assistant Examiner* — Scott Lawrence Strickler (57) ABSTRACT

An agricultural machine having an auxiliary vehicle with a driver's workplace, an agricultural vehicle with a loading ramp for transporting the auxiliary vehicle and a control unit. The agricultural machine is operable in a combined configuration in which the auxiliary vehicle is placed on the loading ramp or in a separated configuration in which the auxiliary vehicle is removable from the loading ramp. The driver's workplace has a human machine interface for controlling a manual driving function of the agricultural vehicle and a manual driving function of the auxiliary vehicle. The control unit is configured to disable the manual driving function of the auxiliary vehicle if the combined configuration of the agricultural machine is present and to enable the manual driving function of the auxiliary vehicle if the separated configuration of the agricultural machine is present.

16 Claims, 5 Drawing Sheets

AGRICULTURAL MACHINE OPERABLE IN A COMBINED OR IN A SEPARATED CONFIGURATION

FIELD

The present disclosure relates generally to an agricultural machine having a manual and an autonomous driving function.

BACKGROUND

Agricultural machines such as tractors, sprayers, harvesters and so on can have autonomous driving functions to accelerate, steer and brake the agricultural machine without an intervention of an operator of the agricultural machine. These machines can comprise a receiver for receiving position signals of a global navigation satellite system (GNSS), e. g. GPS, to be guided along a predefined path in the agricultural field. The position signals of the machines are compared with the position of the path to generate control commands for the autonomous driving function. While the agricultural machine is operating autonomously in the agricultural field the operator of the agricultural machine can concentrate on the implements and the tasks to surveil the treatment of the agricultural field instead of driving the agricultural machine.

BRIEF SUMMARY

Since the maturity level of autonomous operating machines increases more and more manual interventions to correct the autonomous processes are getting less necessary. Thus, it is an objective to provide an agricultural machine that enables the operator to execute tasks other than surveilling and correcting the autonomous process as for example driving to another point of interest.

According to an aspect of the invention there is provided an agricultural machine including an auxiliary vehicle, an agricultural vehicle and a control unit. The auxiliary vehicle includes a driver's workplace. The agricultural vehicle includes a loading ramp for transporting the auxiliary vehicle. The agricultural machine is operable in a combined configuration or in a separated configuration. The driver's workplace includes a human machine interface for controlling a manual driving function of the agricultural vehicle and a manual driving function of the auxiliary vehicle. The control unit is configured to disable the manual driving function of the auxiliary vehicle if the combined configuration of the agricultural machine is present and to enable the manual driving function of the auxiliary vehicle if the separated configuration of the agricultural machine is present.

In the combined configuration of the agricultural machine the agricultural vehicle and the auxiliary vehicle form a single unit. The agricultural machine may be controlled by the human machine interface of the auxiliary vehicle as a single unit. The combined configuration may be present when the auxiliary vehicle is placed on the loading ramp of the agricultural vehicle, e. g. to transport the auxiliary vehicle.

In the separated configuration of the agricultural machine the agricultural vehicle and the auxiliary vehicle form independent units. Each independent unit may be controlled individually by the human machine interface of the auxiliary vehicle. The separated configuration may be present when the auxiliary vehicle is removed from the loading ramp and/or when the loading ramp is in a position in which the auxiliary vehicle is removable from the loading ramp.

So, the agricultural machine includes two vehicles that may be either controlled as a single unit when the combined configuration is present or controlled independently when the separated configuration is present. In the combined configuration, manual driving functions as steering, braking or accelerating may be assigned to the agricultural vehicle so that the operator can drive the agricultural machine, e. g. from a farm to an agricultural field, by controlling the human machine interface of the auxiliary vehicle located on the loading ramp of the agricultural vehicle. I. e., the human machine interface of the auxiliary vehicle may be used to control the agricultural vehicle when it transports the auxiliary vehicle. The manual driving function of the auxiliary vehicle may be disabled to avoid an unintended drop down of the auxiliary vehicle from the loading ramp of the agricultural vehicle.

When the operator arrives at the agricultural field the configuration of the agricultural machine may be changed from the combined configuration to the separated configuration. In the separated configuration, the auxiliary vehicle may be placed next to the agricultural vehicle on the ground. Then, the agricultural vehicle and the auxiliary vehicle may be controlled independently. The manual driving function may be reassigned to the auxiliary vehicle to enable the manual driving function of the auxiliary vehicle so that the operator can control the auxiliary vehicle by the human machine interface instead of the agricultural vehicle. The agricultural vehicle may comprise an autonomous driving function to move autonomously over the agricultural field and to control the implement automatically. The agricultural vehicle may be used for treatment of the agricultural field, e. g. to pull an implement connected to the agricultural vehicle. While the agricultural vehicle is operating autonomously, the operator may execute other tasks with the auxiliary vehicle as driving back to the farm, inspect soils of the agricultural field before the agricultural vehicle passages, visit another machine of the fleet, etc.

The control unit may be configured to enable an autonomous driving function of the agricultural vehicle if the separated configuration of the agricultural machine is present. The autonomous driving function may comprise all driving functions that can be executed manually as steering, braking or accelerating. The autonomous driving function may be enabled when the manual driving function is reassigned from the agricultural vehicle to the auxiliary vehicle. The autonomous driving function may be started or stopped by a corresponding input to the human machine interface. The control unit may comprise a GNSS receiver, e. g. a GPS receiver, to receive position signals to be processed by the control unit for driving autonomously. In case of a malfunction of the autonomous driving function of the agricultural vehicle the agricultural vehicle can be controlled remotely by the human machine interface of the auxiliary vehicle.

The agricultural vehicle may include a lifting device for moving the loading ramp between a loading position and a transport position. The lifting device can comprise an actuator of any type, e. g. a hydraulic piston cylinder combination or an electromechanical actuator. The loading ramp may include a position sensor to send a corresponding signal to the control unit when the loading ramp is in the transport position or in the loading position. In the loading position, the auxiliary vehicle may be moved from the loading ramp to the ground to change the configuration of the agricultural machine to the separated configuration or to move the auxiliary vehicle from the ground to the loading ramp to change the configuration of the agricultural machine to the combined configuration.

The combined configuration of the agricultural machine is present when the loading ramp is in the transport position and the auxiliary vehicle is placed on the loading ramp. The separated configuration of the agricultural machine is getting present, or the combined configuration of the agricultural machine changes to the separated configuration, respectively, when the loading ramp reaches its loading position with the auxiliary vehicle placed on the loading ramp. Then, the auxiliary vehicle is removable from the loading ramp and can move off the loading ramp. The separated configuration of the agricultural machine remains present as long as the auxiliary vehicle is removed from the loading ramp. The separated configuration of the agricultural machine changes to the combined configuration when the auxiliary vehicle is placed again on the loading ramp to move the loading ramp carrying the auxiliary vehicle from the loading position back to the transport position.

The lifting device may be configured to move the loading ramp in a direction deviating from an orientation of a longitudinal axis of the agricultural vehicle. Since an implement may be connected to the front or rear side of the agricultural vehicle the loading ramp would collide with the implement if the lifting device would move the loading ramp in a direction along an orientation of a longitudinal axis of the agricultural vehicle when moving the loading ramp from the transport position to the loading position. Instead, the loading ramp can be moved in a direction deviating from an orientation of a longitudinal axis, as for example an orientation of a lateral or cross axis of the agricultural vehicle, to avoid a collision with the implement.

The control unit may be configured to enable the manual driving function of the agricultural vehicle and to disable the manual driving function of the auxiliary vehicle if the loading ramp is in the transport position. In the transport position, the manual driving function may be reassigned from the auxiliary vehicle to the agricultural vehicle to enable a manual control of the agricultural machine. In addition, the manual driving function of the auxiliary vehicle may be disabled when it is transported by the agricultural vehicle to avoid that the auxiliary vehicle can be driven unintentionally.

The control unit may be configured to enable the manual driving function of the auxiliary vehicle if the loading ramp is in the loading position. In the loading position, the manual driving function may be reassigned from the agricultural vehicle to the auxiliary vehicle to enable a manual control of the auxiliary vehicle. Then, the auxiliary vehicle can be safely moved from the loading ramp to the ground without the risk of an unintended movement of the agricultural vehicle caused by a manual operation of the human machine interface.

The agricultural vehicle may include a protective structure being movable between a released position and a secured position for protecting the auxiliary vehicle if it is placed on the loading ramp. The protective structure may be a roll over protective structure (ROPS) as a rollover bar. The protective structure can be moved to a released position to avoid a collision with the loading ramp when the loading ramp is moved from the loading position to the transport position or vice versa, or to avoid a collision with the auxiliary vehicle when the auxiliary vehicle is moved from the loading ramp to the ground or vice versa. In the closed position, the protective structure may embrace the auxiliary vehicle to protect it against a collision, e. g. in case of a roll over or a vehicle crash.

The protective structure may be arranged at the loading ramp. When the loading ramp is moved from the transport position to the loading position or vice versa the auxiliary vehicle located on the loading ramp will be protected during the movement of the loading ramp.

Alternatively, the protective structure may be arranged at a part of the agricultural vehicle other than the loading ramp.

The control unit may be configured to disable the manual driving function of the agricultural vehicle if the protective structure is in the released position and if the combined configuration of the agricultural machine is present. The protective structure may include a sensor to detect the position of the protective structure, i. e. released or secured. The sensor signal may be sent to the control unit. The released position of the protective structure signals an unsafe state even when the auxiliary vehicle is located on the loading ramp. Thus, manual driving of the agricultural machine may be disabled as long as the unsafe state is present and enabled only after a safe state is present.

The agricultural vehicle may include a securing element for fastening the auxiliary vehicle to the loading ramp. The securing element may be a wheel clamp or a parking boot arranged at the loading ramp. When the auxiliary vehicle is located on the loading ramp the securing element may be fastened to at least one of the wheels of the auxiliary vehicle. The securing element may include a sensor to detect that the at least one wheel of the auxiliary vehicle is fastened by the securing element and to send this signal to the control unit.

The control unit may be configured to disable the manual driving function of the agricultural vehicle unless the auxiliary vehicle is fastened if the combined configuration of the agricultural machine is present. As long as the auxiliary vehicle isn't fastened in the combined configuration of the agricultural machine an unsafe state is present. Thus, manual driving of the agricultural machine may be disabled as long as the unsafe state is present and enabled only after a safe state is present.

A longitudinal axis of the auxiliary vehicle may be oriented (almost) along a cross axis of the agricultural vehicle if the combined configuration of the agricultural machine is present. Thus, a very compact arrangement of the agricultural vehicle and the auxiliary vehicle can be achieved in the combined configuration of the agricultural machine.

The driver's workplace may include a seat rotatable around a rotation axis. The control unit may be configured to disable the manual driving function of the agricultural vehicle unless a seating position of the seat is oriented along a longitudinal axis of the agricultural vehicle if the combined configuration of the agricultural machine is present. Since the orientation of the seat of the auxiliary vehicle influences the viewing direction of the operator the orientation of the seat can be adapted to bring the viewing direction of the operator in line with the longitudinal axis of that vehicle the operator wants to drive. For example, the longitudinal axis of the auxiliary vehicle may be perpendicular to the longitudinal axis of the agricultural vehicle in the combined configuration of the agricultural machine. Depending on whether the operator wants to drive the auxiliary vehicle or the agricultural vehicle he can adapt the orientation of the seat to its longitudinal axis accordingly. A sensor can detect the orientation of the seat and send a corresponding signal to the control unit. The control unit may allow to drive only that vehicle to whose longitudinal axis the seat is oriented.

The agricultural vehicle may include a front part, a rear part and an articulated steering connecting the front part with the rear part. The agricultural vehicle may have a vertical axis as steering axis.

The loading ramp may be arranged at the rear part. Since the weight of the rear part is raised in the combined configuration of the agricultural machine due to the weight of the auxiliary vehicle located on the loading ramp heavy components as motor or transmission of the agricultural vehicle may be installed in the front part of the agricultural vehicle to balance the total weight of the agricultural machine.

The human machine interface may be configured to control the lifting device, the protective structure and/or the securing element. Thus, the operator can control the corresponding devices of the agricultural vehicle when he is sitting at his driver's workplace and operating in the auxiliary vehicle not only in the combined configuration of the agricultural machine but also in the separated configuration of the agricultural machine. The control signals to control the lifting device, the protective structure or the securing element may be wirelessly transmitted from the human machine interface to the control unit.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
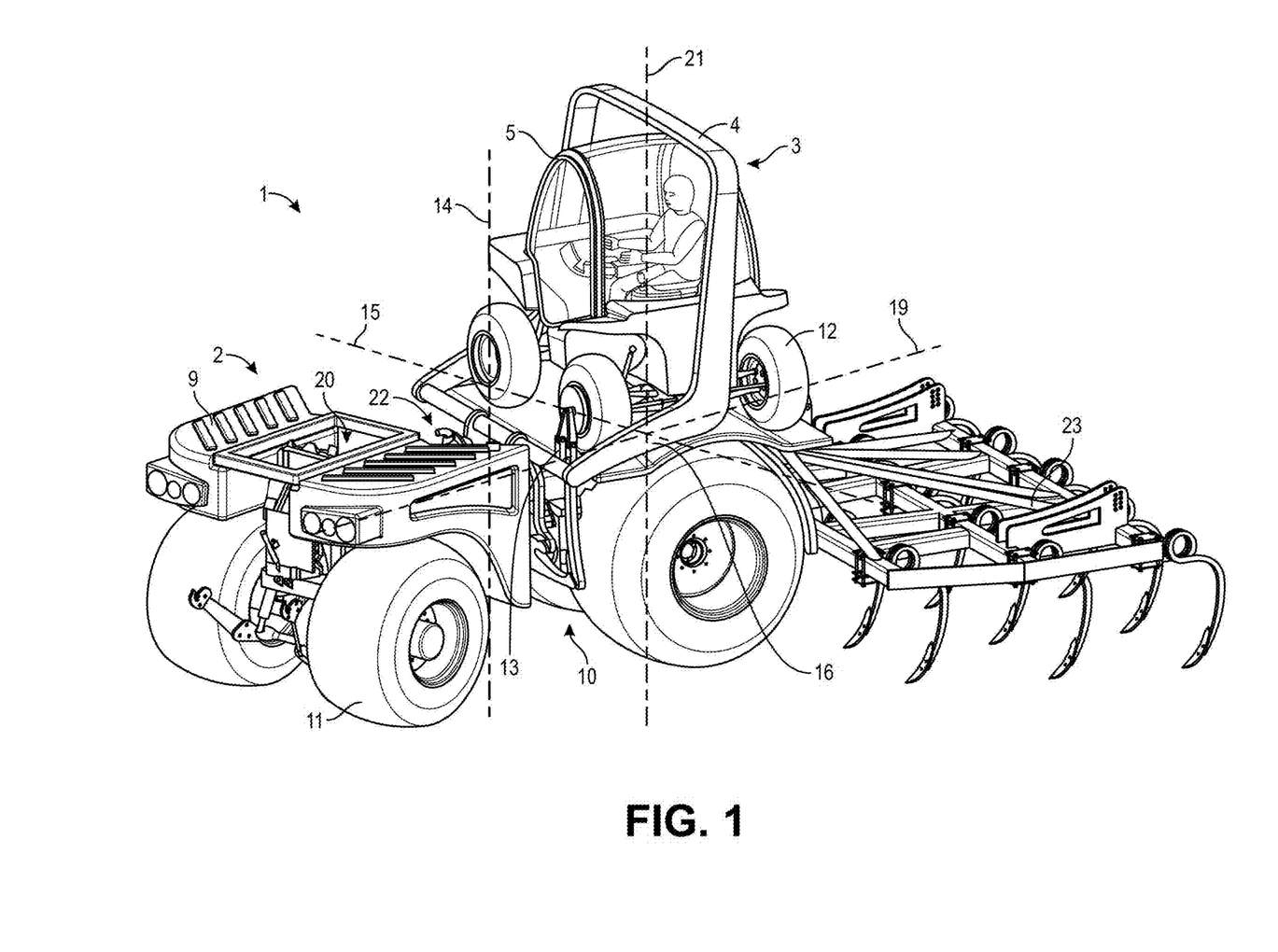
FIG. 1 illustrates an agricultural machine with an implement.
Figure 2:
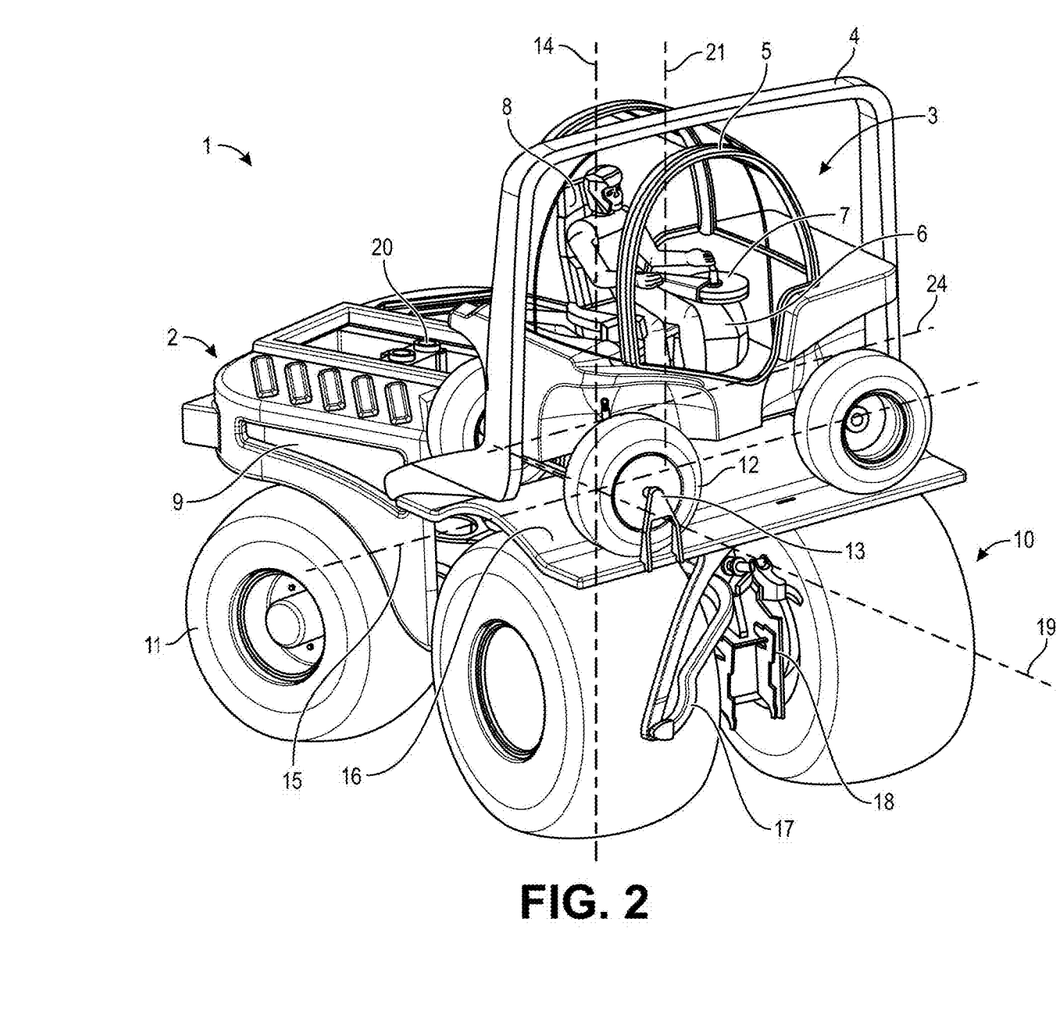
FIG. 2 illustrates an agricultural machine in a combined configuration.

FIG. 1 to FIG. 4 show an agricultural machine 1 comprising an agricultural vehicle 2, an auxiliary vehicle 3 and a control unit 20. The configuration of the agricultural machine 1 can be changed between a combined configuration and a separated configuration. In the combined configuration, the agricultural vehicle 2 is located on a loading ramp 16 of the agricultural vehicle 2 and forms together with the auxiliary vehicle 3 a single unit, as can be seen in FIG. 1 and FIG. 2.

The agricultural vehicle 2 comprises a front part 9 that is steerable connected to a rear part 10 by means of an articulated steering 22 having a vertical axis 14 as a steering axis. Each part 9 and 10 comprises at least a wheel 11. All heavy components as engine and transmission of the agricultural vehicle 2 can be integrated in the front part 9. The control unit 20 can also be built into the front part 9.

Figure 3:
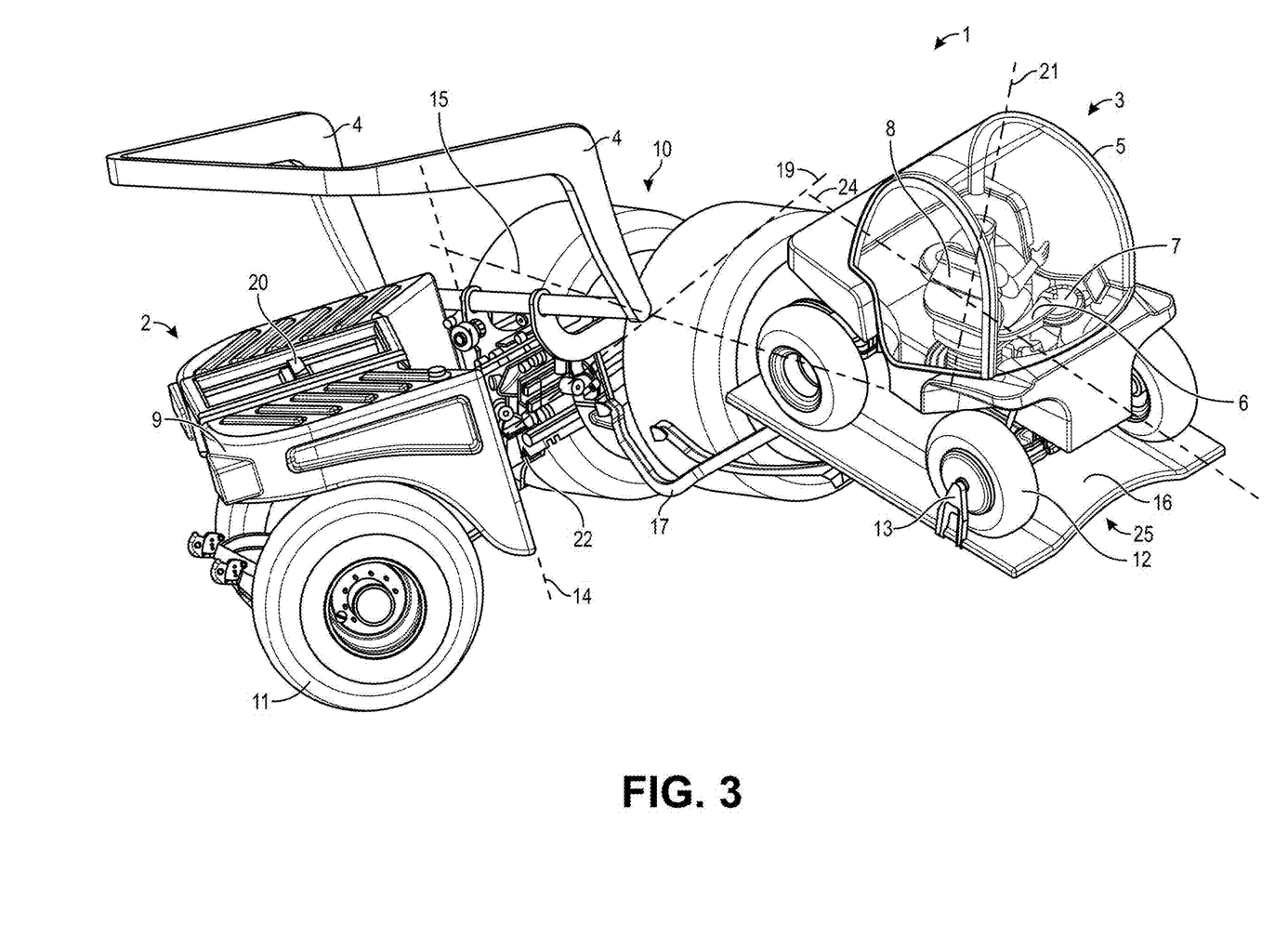
FIG. 3 illustrates an agricultural machine.

The rear part 10 comprises a loading ramp 16 to place on the auxiliary vehicle 3. The loading ramp 16 is moveable between a transport position, as can be seen in FIG. 1 and FIG. 2, and a loading position, as can be seen in FIG. 3. A lifting device 17 that is attached at the rear part 10 of the agricultural vehicle 2 can move the loading ramp 16 between these two positions. The lifting device 17 comprises an actuator of any type, e. g. a hydraulic or electromechanical actuator. The loading ramp 16 and/or the lifting device 17 can be equipped with a sensor to detect the position of the loading ramp 16 and to send a corresponding position signal to the control unit 20.

The rear part 10 also comprises a protective structure 4 and at least a securing element 13. The protective structure 4 is a roll over protective structure (ROPS) configured as a rollover bar. The protective structure 4 can be moved between a secured position, as shown in FIG. 1 and FIG. 2, and a released position, as shown in FIG. 3. In the secured position, the protective structure 4 embraces the auxiliary vehicle 3 from the loading ramp 16 to a cabin 5 of the auxiliary vehicle 3 so that the protective structure 4 protects the auxiliary vehicle 3 located on the loading ramp 16 as well as the operator of the agricultural machine 1 sitting in a driver's workplace 6 of the auxiliary vehicle 3 against collisions and injuries. In the released position, the protective structure 4 is turned away from the loading ramp 16 and the auxiliary vehicle 3, respectively. In this position, the loading ramp 16 can be moved to change its position and the auxiliary vehicle 3 can be loaded or unloaded from the loading ramp 16 without colliding against the protective structure 4. The protective structure 4 can be equipped with a sensor to detect the position of the protective structure 4 and to send a corresponding signal to the control unit 20.

The at least one securing element 13 is configured as a wheel clamp or parking boot to fasten at least one of the wheels 12 of the auxiliary vehicle 3 to the loading ramp 16 for avoiding a rolling or dropping down of the auxiliary vehicle 3 from the loading ramp 16. The at least one securing element 13 can be equipped with a sensor to detect whether the at least one wheel 12 of the auxiliary vehicle 3 is fastened (or not) and to send a corresponding signal to the control unit 20.

The rear part 10 also comprises an interface 18 for connecting an implement 23 to the agricultural vehicle 2. The interface 18 can be a hitch of any type, e. g. a 3-point linkage.

The agricultural vehicle 2 has a longitudinal axis 19 and a cross axis 15 next to the vertical axis 14 used as steering axis.

The auxiliary vehicle 3 has a longitudinal axis 24 and comprises wheels 12 and a cabin 5. In the cabin 5 is a driver's workplace 6 comprising a seat 8 for the operator and a human machine interface 7. The driver's workplace 6 can be rotated in the cabin 5 so that the seat 8 can rotate around a rotation axis 21. Thus, the operator can change his viewing direction by rotating the seat 8 around the rotation axis 21 and bring his viewing direction in line with the longitudinal axis 19 of the agricultural vehicle 2 for driving the agricultural vehicle 2 (e. g. in the combined configuration of the agricultural machine 1) or in line with the longitudinal axis 24 of the auxiliary vehicle 3 for driving the auxiliary vehicle 3 (e. g. in the separated configuration of the agricultural machine 1). Both, the agricultural vehicle 2 and the auxiliary vehicle 3 are controllable by the human machine interface 7. The operator can select which vehicle 2 or 3 he wants to control with the human machine interface 7 and then use the human machine interface 7 to control the driving functions of the selected vehicle 2 or 3 as accelerating, steering and braking. The human machine interface 7 can comprise several input elements as a joystick, pedals, buttons or knobs and output elements as a display, warning lights or loudspeakers.

FIG. 2 shows the lifting device 17 in a folded state to hold the loading ramp 16 in the transport position.

FIG. 3 shows a transition of the agricultural machine 1 from one configuration, e. g. the combined configuration, to the other configuration, e. g. the separated configuration. For example in this case here, the lifting device 17 has been unfolded and has moved the loading ramp 16 in a direction that is oriented different to the direction of the longitudinal axis 19 of the agricultural vehicle 2. The loading ramp 16 has been moved in a direction oriented or almost oriented as the direction of the cross axis 15 of the agricultural vehicle 2.

As can be seen in FIG. 3, the protective structure 4 is in the released position so that the auxiliary vehicle 3 can be unloaded. So, the loading wouldn't collide against an implement 23 that could be connected to the interface 18 at the rear side of the agricultural vehicle 2 (see FIG. 1).

The outer edge 25 of the loading ramp 16 is in contact with the ground so that the auxiliary vehicle 3 can move from the loading ramp 16 to the ground or vice versa. The loading ramp 16 is oriented in direction or almost in direction of the cross axis 15 of the agricultural vehicle 2 when the loading ramp 16 is in the transport position as well as in the loading position. I. e., the operator needs to drive the auxiliary vehicle 3 to a lateral (left) side of the agricultural vehicle 2 so that the longitudinal axis 24 of the auxiliary vehicle 3 is also oriented in line with the orientation of the loading ramp 16 if the operator wants to move the auxiliary vehicle 3 on the loading ramp 16. Thus, the longitudinal axis 24 of the auxiliary vehicle 3 will also be oriented (almost) in line with the cross axis 15 of the agricultural vehicle 2 in the combined configuration of the agricultural machine 1.

Figure 4:
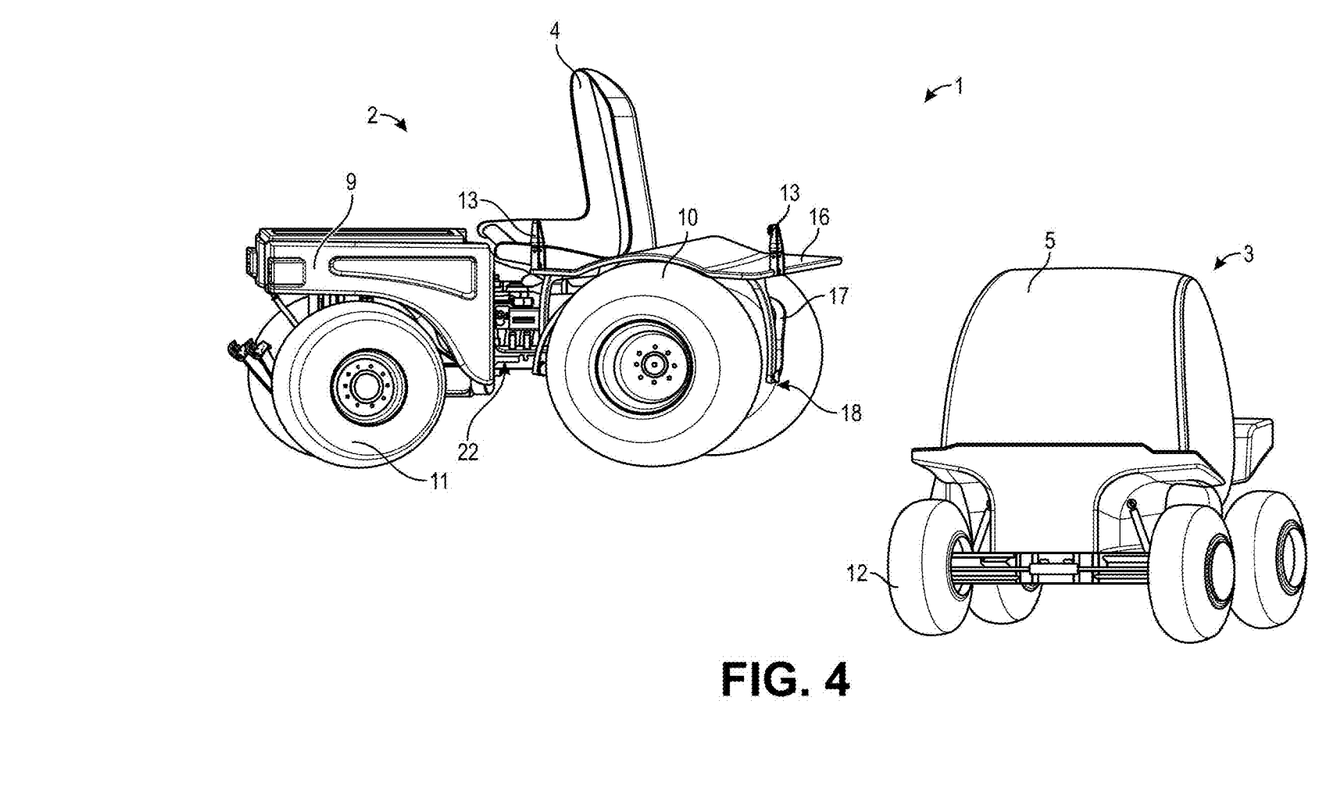
FIG. 4 illustrates an agricultural machine in a separated configuration.

FIG. 4 shows the agricultural machine 1 in the separated configuration in which the auxiliary vehicle 3 has left the loading ramp 16 and is located on the ground as the agricultural vehicle 2. The loading ramp 16 has been moved back to the transport position. The protective structure 4 has been moved to the secured position. Both, the agricultural vehicle 2 and the auxiliary vehicle 3 can be moved independently from each other. For example, the control unit 20 can enable an autonomous driving function of the agricultural vehicle 2 when the auxiliary vehicle 3 has left the loading ramp 16. While the agricultural vehicle 2 can drive unmanned and autonomously through the agricultural field the operator can drive the auxiliary vehicle 3 and perform other tasks. So, in the separated configuration, both vehicles 2 and 3 can be driven independently.

Figure 5:
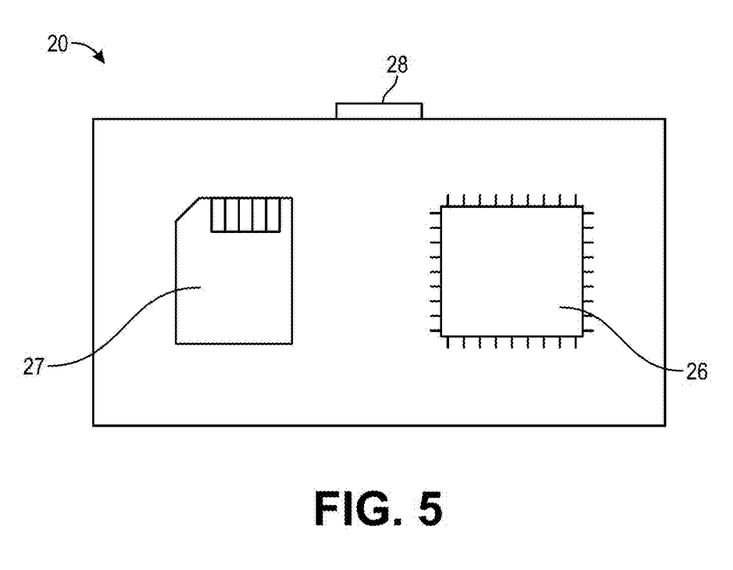
FIG. 5 illustrates a control unit.

FIG. 5 shows a schematic view of the control unit 20. The control unit 20 comprises a controller 26, a memory 27 and an interface 28. The memory 27 contains data and executable programs (computer-implemented procedures or methods) that can be retrieved, processed and executed by the controller 26. The control unit 20 can be connected with several devices of the agricultural machine 1 via the interface 28. The control unit 20 can also send or receive data or signals via the interface 28 and store the data or signals to the memory 27.

The control unit 20 and the human machine interface 7 are connected wirelessly with each other. Thus, the operator can control and drive the auxiliary vehicle 3 as well as the agricultural vehicle 2 by the human machine interface 7. In the separated configuration of the agricultural machine 1, the operator can control both vehicles 2 and 3 simultaneously and independently. For example, the operator can drive the agricultural vehicle 2 remotely by the human machine interface 7 or he can intervene the autonomous operation of the agricultural vehicle 2 in case of a dangerous situation, e. g. initiate an emergency stop.

In the combined configuration (see FIG. 2) it is not intended that the auxiliary vehicle 3 can be moved on the loading ramp 16 being in the transport position. Thus, the control unit 20 is configured to disable the manual driving function of the auxiliary vehicle 3 if the combined configuration of the agricultural machine 1 is present. But it is intended that the operator can drive the agricultural machine 1 in the combined configuration. Thus, the control unit 20 is configured to enable the manual driving function of the agricultural vehicle 2 if the loading ramp 16 is in the transport position.

But for the case that the protective structure 4 is still in the released position the control unit 20 is configured to disable the manual driving function of the agricultural vehicle 2 until the protective structure 4 is in the secured position. The same applies to the securing element 13. For the case that the auxiliary vehicle 3 is still unfastened the control unit 20 is configured to disable the manual driving function of the agricultural vehicle 2 unless the auxiliary vehicle 3 is fastened by the at least one securing element 13. In addition, the control unit 20 is configured to disable the manual driving function of the agricultural vehicle 2 until the seating position of the seat 8 is oriented along the longitudinal axis 19 of the agricultural vehicle 2. Based on the sensor signals of the protective structure 4, the securing element 13 and the seat 8 the control unit 20 can check whether the protective structure 4 is in the secured position, whether the auxiliary vehicle 3 is fastened by the at least one securing element 13 and whether the seat 8 is oriented along the longitudinal axis 19 of the agricultural vehicle 2. If all conditions apply the control unit 20 may enable the manual driving function of the agricultural vehicle 2 so that the operator can drive the agricultural machine 1 by the human machine interface 7 of the auxiliary vehicle 3.

For moving the auxiliary vehicle 3 off the loading ramp 16 when the loading ramp 16 is in the loading position (see FIG. 3) the control unit 20 is configured to enable the manual driving function of the auxiliary vehicle 3 if the separated configuration of the agricultural machine 1 is present.

As mentioned above the operator can use the human machine interface 7 to drive the agricultural vehicle 2 as well as the auxiliary vehicle 3. In addition, the operator can use the human machine interface 7 to control the lifting device 17, the protective structure 4 and/or the securing element 13 in the combined configuration as well as in the separated configuration of the agricultural machine 1.

All references cited herein are incorporated herein in their entireties. If there is a conflict between definitions herein and in an incorporated reference, the definition herein shall control.

LISTING OF DRAWING ELEMENTS 1 agricultural machine
2 agricultural vehicle
3 auxiliary vehicle
4 protective structure
5 cabin
6 driver's workplace 7 human machine interface
8 seat
9 front part
10 rear part
11 wheel
12 wheel
13 securing element
14 vertical axis
15 cross axis
16 loading ramp
17 lifting device
18 interface
19 longitudinal axis
20 control unit
21 rotation axis
22 articulated steering
23 implement
24 longitudinal axis
25 controller
26 memory
27 interface

What is claimed is:

1. An agricultural machine comprising:
an auxiliary vehicle comprising a driver's workplace;
an agricultural vehicle comprising a loading ramp for transporting the auxiliary vehicle and a protective structure being moveable between a released position and a secured position for protecting the auxiliar vehicle when placed on the loading ramp; and
a control unit;
wherein the agricultural machine is operable in a combined configuration or in a separated configuration;
wherein the driver's workplace comprises a human machine interface for controlling a manual driving function of the agricultural vehicle and a manual driving function of the auxiliary vehicle; and
wherein the control unit is configured to disable the manual driving function of the auxiliary vehicle if the combined configuration of the agricultural machine is present and to enable the manual driving function of the auxiliary vehicle if the separated configuration of the agricultural machine is present.

2. The agricultural machine of claim 1, wherein the control unit is configured to enable an autonomous driving function of the agricultural vehicle if the separated configuration of the agricultural machine is present.

3. The agricultural machine of claim 1, wherein the agricultural vehicle comprises a lifting device for moving the loading ramp between a loading position and a transport position.

4. The agricultural machine of claim 3, wherein the lifting device is configured to move the loading ramp in a direction deviating from an orientation of a longitudinal axis of the agricultural vehicle.

5. The agricultural machine of claim 3, wherein the control unit is configured to enable the manual driving function of the agricultural vehicle and to disable the manual driving function of the auxiliary vehicle if the loading ramp is in the transport position.

6. The agricultural machine of claim 3, wherein the control unit is configured to enable the manual driving function of the auxiliary vehicle if the loading ramp is in the loading position.

7. The agricultural machine of claim 3, wherein the separated configuration of the agricultural machine is present when the loading ramp reaches the loading position with the auxiliary vehicle placed on the loading ramp.

8. The agricultural machine of claim 3, wherein the combined configuration of the agricultural machine is present when the auxiliary vehicle is placed on the loading ramp to move the loading ramp carrying the auxiliary vehicle from the loading position to the transport position.

9. The agricultural machine of claim 1, wherein the protective structure is arranged at the loading ramp.

10. The agricultural machine of claim 1, wherein the control unit is configured to disable the manual driving function of the agricultural vehicle if the protective structure is in the released position and if the combined configuration of the agricultural machine is present.

11. The agricultural machine of claim 1,
wherein the agricultural vehicle comprises a securing element for fastening the auxiliary vehicle to the loading ramp; and
wherein the control unit is configured to disable the manual driving function of the agricultural vehicle unless the auxiliary vehicle is fastened if the combined configuration of the agricultural machine is present.

12. The agricultural machine of claim 1, wherein a longitudinal axis of the auxiliary vehicle is oriented along a cross axis of the agricultural vehicle if the combined configuration of the agricultural machine is present.

13. The agricultural machine of claim 1,
the driver's workplace comprising a seat rotatable around a rotation axis; and
wherein the control unit is configured to disable the manual driving function of the agricultural vehicle unless a seating position of the seat is oriented along a longitudinal axis of the agricultural vehicle if the combined configuration of the agricultural machine is present.

14. The agricultural machine of claim 1, the agricultural vehicle comprising a front part, a rear part and an articulated steering connecting the front part with the rear part and having a vertical axis as steering axis.

15. The agricultural machine of claim 14, wherein the loading ramp is arranged at the rear part.

16. The agricultural machine of claim 1,
wherein the agricultural vehicle comprises a lifting device for moving the loading ramp between a loading position and a transport position,
wherein the agricultural vehicle comprises a securing element for fastening the auxiliary vehicle to the loading ramp,
wherein the control unit is configured to disable the manual driving function of the agricultural vehicle unless the auxiliary vehicle is fastened if the combined configuration of the agricultural machine is present, and
wherein the human machine interface is configured to control the lifting device, the protective structure and/or the securing element.

* * * * *